Nov. 18, 1958  E. H. BADGER, JR  2,860,652
APPARATUS FOR EMPTYING TANKS
Filed Jan. 24, 1955  3 Sheets-Sheet 1

INVENTOR.
EVERETT H. BADGER JR.
BY
Lyon & Lyon
ATTORNEYS

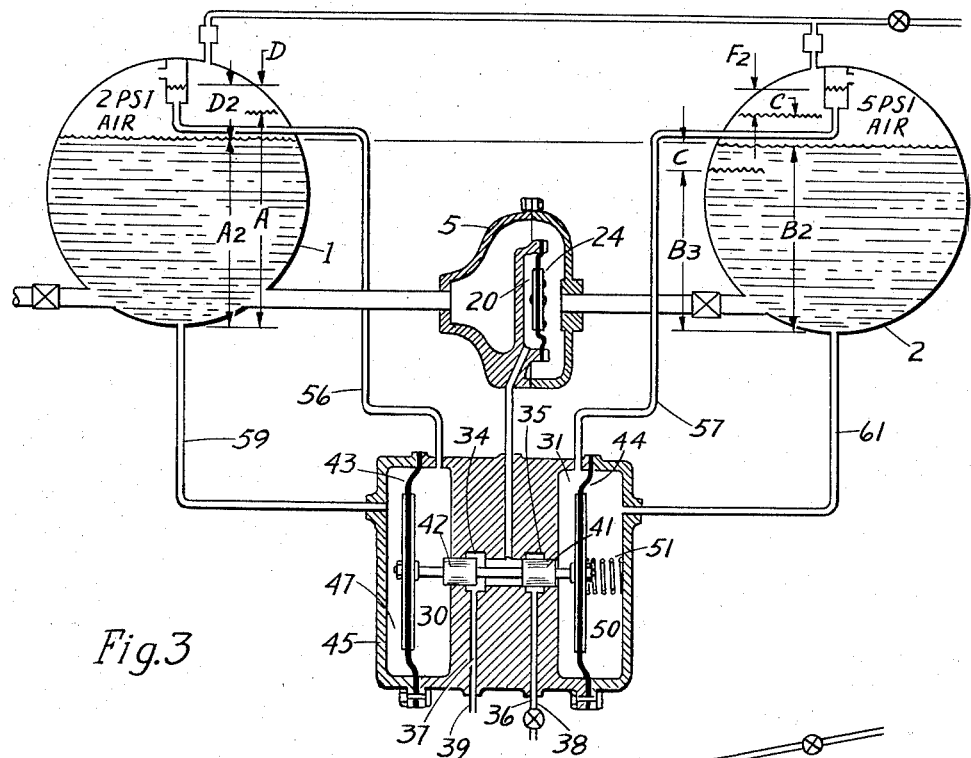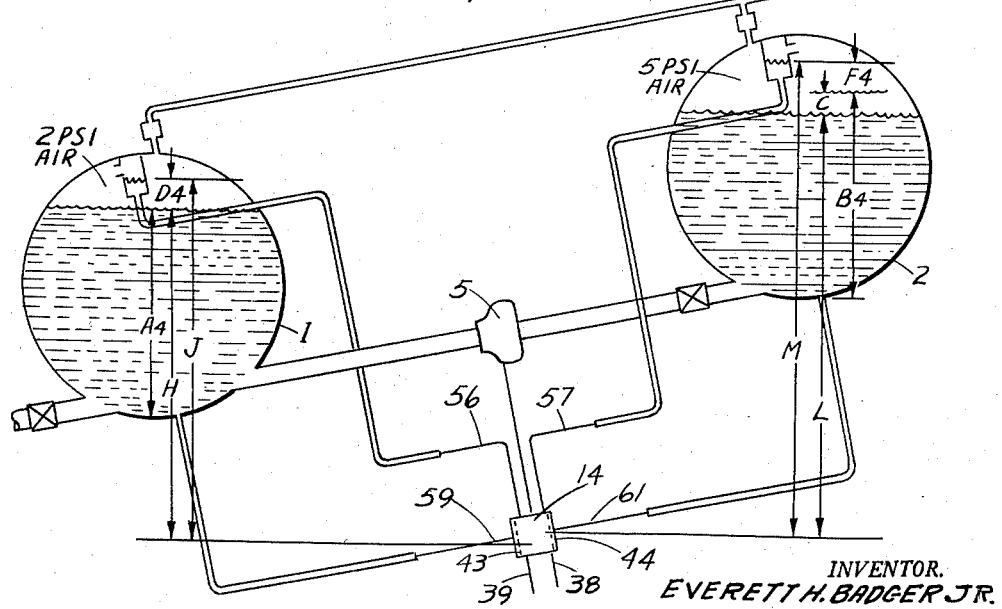

Nov. 18, 1958   E. H. BADGER, JR   2,860,652
APPARATUS FOR EMPTYING TANKS

Filed Jan. 24, 1955   3 Sheets-Sheet 3

INVENTOR.
EVERETT H. BADGER JR.
BY
ATTORNEYS

United States Patent Office 2,860,652
Patented Nov. 18, 1958

2,860,652

APPARATUS FOR EMPTYING TANKS

Everett H. Badger, Jr., Los Angeles, Calif., assignor to Parker-Hannifin Corporation, a corporation of Ohio Application January 24, 1955, Serial No. 483,647

20 Claims. (Cl. 137—98)

The present invention relates to an apparatus for controlling the emptying of liquid from tanks and more particularly to an apparatus for controlling the relative rate at which a pair of tanks empty so that a constant relationship between the heads of the liquid in the two tanks will be maintained.

The invention has particular use in aircraft where it is essential that fuel tanks at different locations in the airplane empty at relatively the same rate to avoid or minimize a shift in the center of gravity of the airplane as the fuel is being consumed.

The invention is an improvement over the apparatus disclosed in the co-pending patent application Serial No. 483,646 of Robert H. Davies, filed January 24, 1955. Among the improvement features is a provision for maintaining substantially the same relationship in the heads of the liquids in two airplane fuel tanks regardless of changes in relative heights of the two tanks due to changes in the attitude of the airplane.

Another object of the present invention is to provide an apparatus of the type described which is adaptable to fuel tanks which are pneumatically pressurized for forcing the fuel from the tanks to a delivery conduit.

It is another object to provide a differential pressure device responsive to pressures sensed at the top and bottom of a pair of pneumatically pressurized tanks for regulating the relative rate at which the tanks empty, and in which the effect of the pneumatic pressures on the differential pressure device is nullified.

Another object is to provide an apparatus of the type described in which one of the tanks is upstream of the other with respect to a single delivery conduit and in which the upstream tank is under higher pneumatic pressure than the downstream tank to preclude back flow of fuel to the upstream tank.

Another object is to provide a means for sensing the difference in heads of liquid within a pair of aircraft fuel tanks regardless of the relative initial heights of the tanks, or of the changes in relative heights due to variations in attitude of the airplane.

Another object is to provide a means for sensing the pressures at the top and bottom of each pair of tanks and utilizing such sensed pressures for controlling the relative rate at which the tanks empty.

Another object is to provide an apparatus of the type described in which the relative rate at which a pair of tanks empty is regulated by a single modulating valve controlled by a differential pressure device responsive to fluid pressures sensed at the top and bottom of each tank.

Other objects will become apparent from a further detailed description and from the drawings in which:

Figure 3 is similar to Figure 1 except that the parts are in the position assumed when the head differential of the liquid in the two tanks is less than a predetermined amount.

Figure 4 is a schematic view showing the liquid head relationships when the relative height of a pair of aircraft fuel tanks changes due to a change in the attitude of the airplane.

Figure 1:
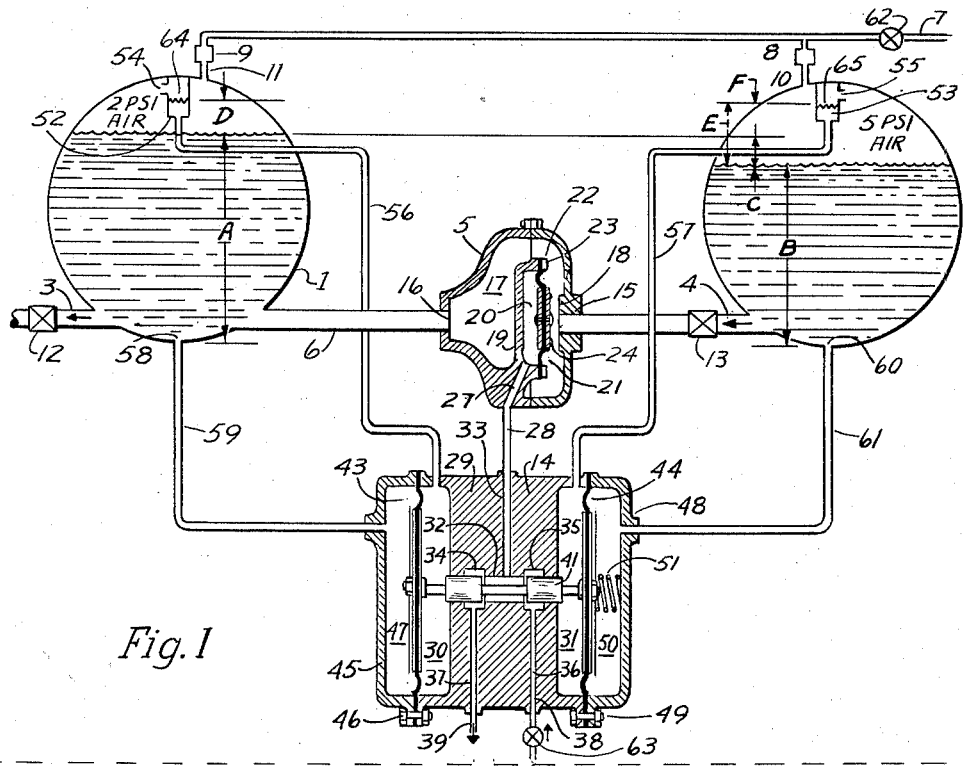
Figure 1 illustrates a schematic view of the apparatus but with the modulating valve and the differential pressure control device shown in relatively enlarged view and with the parts in the position they assume when the two tanks are emptying at a predetermined relative rate.

In a preferred embodiment of the invention as used for aircraft fuel systems, tanks 1 and 2 are provided for receiving the supply of liquid fuel. These tanks may, for example, be mounted in the fuselage with tank 1 being forward and tank 2 aft of the air plane center of gravity. A discharge conduit 3 leads to the engines from tank 1. A discharge conduit from tank 2 is in two sections. Section 4 leads from tank 2 to a modulating valve 5 and section 6 leads from the valve 5 to tank 1. In a modification of this arrangement, section 6 may be connected directly to the conduit 3. On-off valves 12 and 13, preferably electric motor actuated, are mounted in conduits 3 and 4, respectively and are shutoff until fuel is to be supplied to the engines from tanks 1 and 2.

In order to force the fuel from each tank into the discharge conduits, each tank is preferably pneumatically pressurized. Thus, air from a source not shown is introduced into the top of each tank through a conduit 7, pressure regulators 8 and 9, and pipe lines 10 and 11. The pressure regulators may be of any well known construction.

The control means for regulating the relative rate at which tanks 1 and 2 empty includes the modulating valve 5 and a differential pressure device generally designated as 14. The modulating valve 5 has an inlet port 15 connected to the discharge conduit 4 and an outlet port 16 connected to the discharge conduit 6. Both the inlet and outlet ports 15 and 16 communicate with a valve chamber 17. A valve seat 18 surrounds the inlet port 15.

Extending into the valve chamber 17 is a wall section 19 forming a pressure chamber 20. The pressure chamber is closed by a flexible diaphragm 21 clamped at its outer margin to the side walls of the pressure chamber 20 by a metal ring 22 and suitable screws 23. A valve element 24 is attached to the diaphragm 21 and is movable with the latter to and from contact with the seat 18 for controlling flow of fuel between the inlet and outlet ports 15 and 16.

A port 27 leads from the pressure chamber 20 and is connected to a conduit 28 leading to the differential pressure device 14.

The differential pressure means 14 includes a casing 29 having recesses 30 and 31 at each end thereof. A valve bore 32 extends between the two recesses. A port 33 connects the conduit 28 to the valve bore 32.

Spaced on opposite sides of the port 33 are annular undercuts 34 and 35 surrounding the valve bore 32. An inlet port 36 communicates with the annular undercut 35 and an outlet port 37 communicates with the annular undercut 34. Conduit 38 connects the inlet port 36 with a suitable source of fluid pressure (not shown), while the conduit 39 serves as a vent or exhaust connection. The fluid under pressure supplied to conduit 38 is preferably fuel, although air or other gases or liquids may be used.

Mounted within the valve bore 32 is a movable valve member 40 having sealing lands 41 and 42. The valve member 40 is connected at one end to a flexible diaphragm 43 and at the other end to a flexible diaphragm 44. The outer margin of the diaphragm 43 is clamped to the casing 29 by means of a cap 45 and suitable bolts 46 and forms with the cap 45 a pressure chamber 47.

Likewise, the diaphragm 44 is clamped at its outer margin to the casing 29 by means of a cap 48 and suitable bolts 49. The diaphragm 44 forms with the cap 48 a pressure chamber 50. When desired for a purpose to be described later, a spring 51 is interposed between the cap 48 and the diaphragm 44.

Located at the center and top of tanks 1 and 2 are pressure sensing units 52 and 53, respectively. Unit 52 has a pressure sensing port 54 open to the interior of tank 1 and unit 53 has a port 55 open to the top interior of tank 2. Unit 52 is connected to recess 30 in the differential pressure device 14 by means of a conduit 56. The recess 30 is closed by the diaphragm 43 and constitutes a pressure chamber in opposition to chamber 47.

Unit 53 is connected by means of a conduit 57 to the recess 31 in the differential pressure means. The diaphragm 44 closes the recess 31 and the latter constitutes a pressure chamber in opposition to chamber 50.

At the bottom of tank 1 there is a pressure sensing outlet 58 which is connected to pressure chamber 47 by means of a conduit 59. Likewise there is a pressure sensing outlet 60 at the bottom of tank 2 which is connected to pressure chamber 50 by means of a conduit 61.

During operation of the apparatus, pressure chambers 30, 47, 31 and 50, as well as lines 59, 56, 57 and 61 are filled with liquid fuel. To aid in keeping lines 56 and 57 filled with liquid, units 52 and 53 are filled with liquid fuel to levels indicated at 64 and 65, respectively.

In a typical aircraft fuel system installation, the tanks 1 and 2 may be installed at the same height with respect to the normal level flight attitude of the airplane, or either tank may be higher than the other. Valves 12 and 13 are kept closed until it is desired to use the fuel from tanks 1 and 2. At that time, the lines 7 and 38 are cut into an air supply system by suitable conventional valves 62 and 63, respectively, and then the valves 12 and 13 are opened.

Air from supply conduit 7 enters the tanks through the branch conduits 10 and 11. Preferably, the air pressure in tank 2 is maintained at a somewhat higher pressure than the air in tank 1. Typical values are 5 p. s. i. and 2 p. s. i. respectively, these pressures being maintained at these values by regulators 8 and 9.

The air pressure in each tank acts upon the liquid fuel to discharge the same from the tanks. Fuel from tank 2 discharges into conduit 4, through valve 5 and conduit 6 to tank 1. Meanwhile, fuel from tank 1 discharges into conduit 3 which leads to the engines. Having the air in tank 2 at a higher pressure than in tank 1 precludes any back flow from tank 1 to tank 2.

If it is desired to have the head A of fuel within tank 1 greater than the head B of fuel within tank 2 by an amount C and to retain this differential C while the heads A and B are decreasing, a spring 51 is provided for exerting a force upon the diaphragm 44 equivalent to the force of a head of fuel of a magnitude equal to C. If it is desired to maintain the liquid heads substantially equal to each other as the tanks empty, the spring 51 is omitted.

While fuel is emptying from tank 2 into tank 1 and from tank 1 into conduit 3 at a relative rate whereby the head differential C is being maintained, the parts of the modulating valve 5 and the differential pressure means 14 will be in a position as shown in Figure 1.

In this position, the pressure of the liquid at pressure outlet 60 in tank 2 is transmitted through conduit 61 to chamber 50 where it acts on the outer side of the diaphragm 44. The total force transmitted to the outer side of diaphragm 44 includes the 5 p. s. i. air pressure acting upon the liquid within tank 2, the pressure due to the liquid head B, and the pressure due to the head of liquid within conduit 62 and chamber 50, as well as the pressure of the spring 51.

Acting on the other side of diaphragm 44 from within chamber 31 is the head pressure of the liquid within container 53, conduit 57, and chamber 31, as well as the 5 p. s. i. air pressure exerted from the top of tank 2 through the pressure sensing opening 55 to the liquid within the unit 53.

Since the 5 p. s. i. air pressure within the tank is effectively transmitted to both sides of diaphragm 44, the net effect of the air pressure upon the diaphragm 44 is zero. As a result, any unbalanced forces acting upon diaphragm 44 are due to differences in the heads of the liquids acting on either side of the diaphragm, plus the effect of spring 51.

As fuel is emptying from tank 2, the head B decreases and hence the pressure within chamber 50 acting on the outer side of the diaphragm 44 decreases accordingly. Meanwhile, the liquid head acting within chamber 31 remains constant since there is no reduction in the amount of liquid within the container 53 and conduit 57.

Pressure sensing unit 53 is mounted at the top of tank 2 with the level of liquid therein higher by an amount E than the initial level of liquid within tank 2. As a result, the force transmitted to the inner side of diaphragm 44 due to liquid heads is greater than the force transmitted by liquid heads to the outer side of the diaphragm by an amount equal to the effective area of the diaphragm times a head equal to E. However, the spring 51 transmits a force equivalent to that due to a head of magnitude C, therefore there is an initial net overbalance of force due to a head of magnitude F, which is equal to E minus C, acting outwardly on diaphragm 44. Since the liquid head from the unit 53 and conduit 57 remains the same as fuel is being emptied from tank 2, the magnitude of F, and hence the net overbalance of force urging the diaphragm 44 outwardly, increases as the head B within tank 2 decreases.

As the liquid fuel empties from tank 2, it passes through the conduit 4, the valve 5, and conduit 6 into tank 1. Meanwhile, liquid fuel is emptying from tank 1 to conduit 3 at a faster rate than fuel is entering tank 1 from conduit 6 and as a result the level of liquid in both tanks is decreasing.

In tank 1 the pressure of the liquid at pressure outlet 58 is transmitted through conduit 59 to chamber 47 where it acts on the outer side of the diaphragm 43. The total force transmitted to the outer side of diaphragm 43 includes that due to the 2 p. s. i. air pressure acting upon the liquid within tank 1, the pressure due to the liquid head A, and the pressure due to the head of liquid within conduit 59 and chamber 47.

Acting on the other side of the diaphragm 43 from within chamber 30 is the head pressure of the liquid within pressure sensing unit 52, conduit 56, and chamber 30, as well as the 2 p. s. i. air pressure exerted from the top of tank 1 through the pressure sensing opening 54 to the liquid within unit 52.

Since the 2 p. s. i. air pressure within tank 1 is effectively transmitted to both sides of the diaphragm 43, the net effect of the air pressure upon this diaphragm is zero. As a result, any unbalanced forces acting upon diaphragm 43 are due to differences in the heads of the liquids acting on either side of the diaphragm.

Unit 52 is mounted at the top of tank 1 with the level of liquid therein higher by an amount D than the initial level of liquid within tank 1 so that the force acting on the diaphragm 44 due to liquid pressure within chamber 30 is initially higher than the force acting on the diaphragm 43 in the opposite direction due to liquid pressure developed within chamber 30. As a result, there is initially an unbalanced force developed on diaphragm 43 tending to urge the same in an outward direction toward the cap 45, and this unbalanced force is equal to the effective area of diaphragm 43 times a head of magnitude D.

As fuel is emptied from tank 1, the head A decreases and hence the pressure within chamber 47 acting on the outer side of the diaphragm 43 decreases accordingly. Meanwhile, the liquid head acting within chamber 30 remains constant since there is no reduction in the amount of liquid within the unit 52 and conduit 56. Since the liquid head from unit 52 and conduit 56 remains the same as fuel is being emptied from tank 1, the magnitude of D, and hence the net overbalance of force uring the diaphragm 43 outwardly, increases as the head A within tank 1 decreases.

As long as D and F remain equal to each other the unbalanced force acting outwardly on diaphragm 44 will be equal to the unbalanced force acting outwardly on diaphragm 43. Since the valve 40 connects the two diaphragms, these unbalanced forces will cancel each other and the diaphragms will cause the valve 40 to remain in a position as shown in Figure 1. In this position, the land 41 uncovers the undercut 35 a slight amount to meter pressure fluid from inlet port 36 to the outlet port 33 and then through the conduit 28 to pressure chamber 20 of the modulating valve 5. At the same time, the land 42 uncovers the undercut 34 a slight amount to permit a metered escape of pressure fluid from within the valve bore 32 through the outlet port 37 to the vent or exhaust connection 39. The positioning of the valve 40 is such that just enough pressure is metered to the chamber 20 of the modulating valve to position the valve 24 the correct amount from the seat 18 to permit the proper rate of flow from tank 2 relative to the flow from tank 1 for decreasing the heads A and B uniformly. By this means the predetermined head differential C is maintained as the tanks empty.

Figure 2:
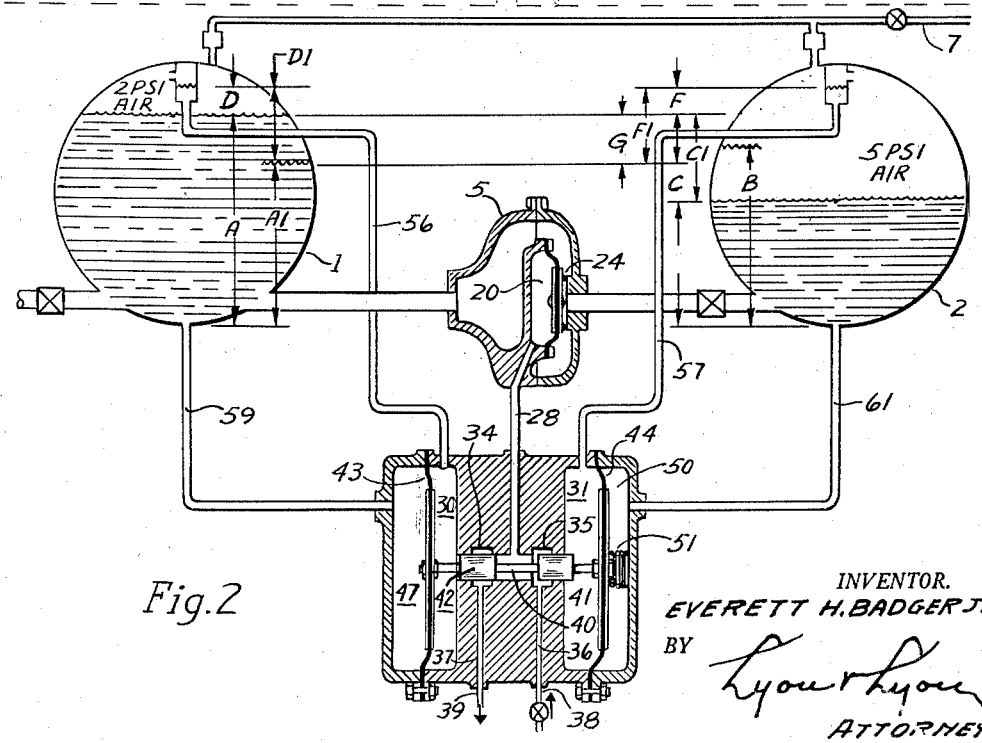
Figure 2 is view similar to Figure 1 but showing the parts in the position assumed when the head differential of the liquid in the two tanks is greater than a predetermined amount.

In the event fuel empties from tank 2 at a proportionately faster rate than from tank 1 the head within tank 2 will decrease at a faster rate than in tank 1 and the predetermined difference C will increase an amount G to some value $C_1$. See Figure 2. As a result, the unbalanced force acting on the inner side of diaphragm 44 will increase from a value equal to a head of magnitude F times the effective area of the diaphragm to a value equal to a head of magnitude $F_1$ (F+G) times the effective area. Meanwhile, the overbalance on diaphragm 43 remains proportionate to the head difference D and since $F_1$ is now larger than D the overbalance on diaphragm 44 will be greater than that on diaphragm 43. As a result, both diaphragms will move to the right as viewed in Figure 2.

In this position the land 41 undercovers the undercut 35 a greater amount to permit free access of pressure fluid from the inlet port 36 to the conduit 28 and chamber 20 of the modulating valve 5. At the same time, the land 42 closes off the undercut 34 to prevent escape of pressure fluid through the vent port 37. As a result, enough pressure is developed in chamber 20 to close the valve 24 and prevent further emptying of tank 2 until tank 1 has emptied to a level $A_1$ at which the predetermined head differential C is restored. At that time the liquid head differentials $D_1$ and $F_1$ will again be equal and the diaphragms 43, 44, valve 40, and valve 24 will resume the position shown in Figure 1.

In the event tank 1 starts to empty at a proportionately faster rate than tank 2, the head in tank 1 will assume some value $A_2$ and be less than the head $B_2$ in tank 2 plus the predetermined differential C. As a result, the overbalance head differential $D_2$ effective upon the inner side of diaphragm 43 will be greater than the overbalance head differential $F_2$ effective on the inner side of diaphragm 44. This will cause the diaphragms to move leftward to position the valve 40 as shown in Figure 3.

In this position the land 41 blocks the undercut 35 to cut off pressure fluid from the inlet 36 while the land 42 uncovers the undercut 34 to freely vent the pressure chamber 20 of the modulating valve 5 to the exhaust port 37. This permits the valve 24 to open wide for increasing the rate at which tank 2 will empty with respect to the rate at which tank 1 is emptying.

The parts will remain in this position until the level in tank 2 has decreased to some value $B_3$ at which the head $B_3$ plus the predetermined differential C will be equal to the prevailing level $A_2$ in tank 1, at which time the differential $F_2$ will have increased to the extent of being equal to the differential $D_2$ and cause the diaphragms 43 and 44 to return the valve 40 to the position shown in Figure 1. This will also cause valve 24 to assume the position shown in Figure 1 for adjusting the flow rate from tank 2 to the proper amount with respect to the flow rate from tank 1 to maintain the predetermined head differential C.

Variations in attitude of the airplane do not have any substantial effect upon maintenance of the predetermined head differential C. Figure 4 illustrates the installation when the attitude of the airplane has changed so that tank 2 is higher than tank 1. For this figure the modulating valve 5 and the differential pressure device 14 are shown in exterior schematic view and are more accurately to size with respect to the tanks. The sums of the liquid heads acting on the outer and inner sides of diaphragm 44 are represented as L and M respectively. C is again the predetermined tank head differential provided by the spring 51. $F_4$ is the difference between M and C plus L and is the effective head causing an overbalance force on diaphragm 44.

The sums of the liquid heads acting on the outer and inner sides of diaphragm 43 are represented as H and J respectively. $D_4$ is the difference between H and J and is the effective head causing an overbalance force on diaphragm 43. As long as $D_4$ and $F_4$ are equal to each other the valves 29 and 5 will remain in the position as shown in Figure 1 and the tanks will empty in proper relation to each other to maintain the predetermined head difference C. As heads $A_4$ and $B_4$ decrease the overbalance differentials $D_4$ and $F_4$ will increase but will remain equal to each other as long as heads $A_4$ and $B_4$ are decreasing at the same rate.

Figure 5:
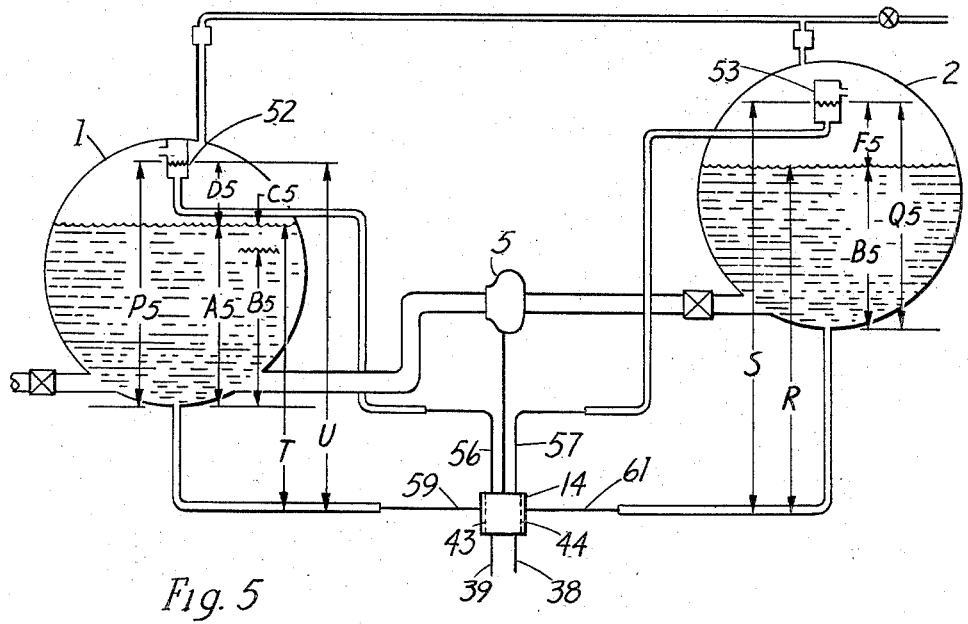
Figure 5 is a schematic view showing the head relationships when one tank is mounted higher than the other and also showing an optional method of establishing a predetermined differential in the two tank heads.

Figure 5 illustrates an installation in which tank 2 is initially installed at a higher level than tank 1. This figure also illustrates how a predetermined difference $C_5$ in the tank heads $A_5$ and $B_5$ may be maintained without the use of the spring 51 shown in Figures 1, 2, and 3. To obtain the head difference $C_5$, pressure unit 52 is installed with its liquid level at a distance $P_5$ above the bottom of tank 1 and pressure unit 53 is installed with its liquid level at a distance $Q_5$ from the bottom of tank 2. The distance $P_5$ is greater than $Q_5$ by an amount $C_5$. While the tanks 1 and 2 are shown as circular in cross section this is by way of illustration only. The actual shape of the tanks in any particular aircraft installation may be dictated in a large measure by the available space.

Since the distances $D_5$ and $F_5$ must be equal in order to exert equal overbalance forces on the diaphragms 43 and 44, the liquid head $A_5$ in tank 1 will be equal to liquid head $B_5$ in tank 2 plus the predetermined differential $C_5$.

Although tank 2 is initially mounted higher than tank 1, this has no effect on the relationship of forces acting on the diaphragms 43 and 44. Thus R and S represent the sums of the head pressures acting on opposite sides of diaphragm 44 and $F_5$ is the net difference for applying an unbalanced force to the diaphragm.

For tank 1, T and U represent the sums of the head pressures acting on opposite sides of diaphragm 43 and $D_5$ is the net difference for applying an unbalanced force to the diaphragm. Thus each diaphragm is subject to the difference in the total heads rather than the heads as such and the particular value of the total heads is immaterial.

Figure 6:
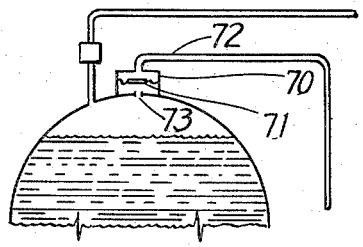
Figure 6 is a fragmentary view showing an optional form and mounting for the unit which senses the fluid pressure at the top of the tanks.

If desired, the top sensing units may be provided with a movable wall, such as a piston or diaphragm, to help retain the liquid within the unit. Such an arrangement is shown in Figure 6, in which the sensing unit 70 has a diaphragm 71 for retaining liquid within line 72. An opening 73 exposes the under side of the diaphragm 71, and hence, the liquid in line 72, to the air pressure at the top of the tank.

While I have shown and described certain embodiments of my invention, it is obvious that various changes in the details may be made without departing from the scope of the invention as defined in the following claims.

I claim:

1. Apparatus for use with a pair of tanks for controlling the discharge of liquid therefrom, comprising, in combination: means for emptying liquid from each tank, means for regulating the rate at which liquid empties from one of the tanks, a control means connected to the regulating means, a pair of vertically spaced pressure sensing outlets in each tank, means for transmitting fluid pressures existing at each of said four outlets to said control means, said control means being responsive to said transmitted pressures for controlling the regulating means.

2. Apparatus in accordance with claim 1 wherein there is an additional means acting on said control means for augmenting one of said transmitted pressures.

3. Apparatus in accordance with claim 1 wherein there is a spring acting on said control means for augmenting the pressure transmitted to said control means from the bottom of one of the tanks.

4. Apparatus in accordance with claim 1 wherein said tanks contain air under pressure acting on the liquid for forcing the liquid from the tanks.

5. Apparatus in accordance with claim 1 wherein said tanks contain air under pressure acting on the liquid for forcing the liquid from the tanks, and the uppermost pressure sensing outlet in each tank is exposed to the air in the respective tank.

6. Apparatus for use with a pair of tanks for controlling the discharge of liquid therefrom, comprising, in combination: means for emptying liquid from each tank, means for regulating the rate at which liquid empties from one of the tanks, a pressure sensing outlet at the top and bottom of each tank, a control means, conduits connected to the pressure sensing outlets of each tank for transmitting the fluid pressures at the top and bottom of each tank to the control means, liquid in the conduits connected to the top pressure sensing outlets of each tank, means for maintaining the amount of liquid in such top connected conduits substantially constant, the head pressure of the liquid in said top connected conduits also acting on the control means, said control means being responsive to the pressures transmitted thereto for controlling the regulating means.

7. Apparatus in accordance with claim 6 wherein the means for maintaining liquid in the top connected conduits comprises a liquid-filled container for each top connected conduit and in communication therewith and with the top of the respective tank.

8. Apparatus for use with a pair of tanks for controlling the discharge of liquid therefrom, comprising, in combination: means for emptying liquid from said tanks including discharge conduits for each tank, a valve in the discharge conduit for said second tank, means for operating said valve, a pressure sensing outlet in the top and bottom of each tank, a differential pressure means, means for transmitting fluid pressures existing at each of said four outlets to said differential pressure means, said differential pressure means being responsive to said transmitted pressures for controlling operation of said valve for regulating the rate at which said second tank empties.

9. Apparatus in accordance with claim 8 wherein the valve is fluid pressure operated and there is a source of fluid pressure under the control of said differential pressure means for operating the valve.

10. Apparatus in accordance with claim 8 wherein the discharge conduit for the second tank discharges into the first tank.

11. Apparatus in accordance with claim 8 wherein the discharge conduit for the second tank discharges into the first tank and said valve is between said tanks.

12. Apparatus in accordance with claim 8 wherein the discharge conduit for the second tank is connected to the first tank and wherein there is a means independent of said valve for preventing back flow from the first tank to the second tank.

13. Apparatus in accordance with claim 8 wherein the discharge conduit for the second tank is connected to the first tank and wherein there is means for discharging the liquid from the second tank at a greater pressure than the pressure of the liquid in the first tank whereby back flow of liquid from the first tank to the second tank is prevented.

14. Apparatus in accordance with claim 8 wherein the discharge conduit for the second tank is in communication with the first tank and wherein said tanks are pneumatically pressureized for discharging the liquid therefrom, the pneumatic pressure in the second tank being greater than that in the first tank whereby backflow of liquid from the first tank to the second tank is prevented.

15. Apparatus for sensing the difference in heads of liquid in a pair of fuel tanks in an aircraft regardless of variations in attitude of the aircraft comprising in combination: pressure sensing outlets at the top and bottom of each tank, a differential pressure means including first and second movable elements each having opposed pressure receiving areas, means for subjecting the opposed areas of the first element to the pressures at said top and bottom outlets of the first tank, respectively, means for subjecting the opposed areas of the second element to the pressures at said top and bottom outlets of the second tank, respectively, and a movable control member connecting said elements so that the net unbalanced force developed by each element is opposed by the other and the control member is positioned by the difference between said unbalanced forces.

16. Apparatus for sensing the difference in heads of liquid in a pair of fuel tanks in an aircraft regardless of variations in attitude of the aircraft, comprising in combination: air under pressure at the top of each tank and acting on the liquid, a control means including first and second movable elements, means for transmitting pressure at the bottom of said first tank due to the air pressure and liquid head within said first tank to one side of said first movable element, means for transmitting the air pressure in said first tank to the opposite side of said first element to cancel the effect of said air pressure on said one side of said element, means for transmitting pressure at the bottom of said second tank due to air pressure and liquid head within said second tank to one side of said second movable element, means for transmitting the air pressure in said second tank to the opposite side of said second element to cancel the effect of said air pressure on said one side of the second element, and a movable control member connecting said elements and positionable by the net difference in unbalanced forces developed on each element.

17. Apparatus for sensing the difference in heads of liquid in a pair of fuel tanks in an aircraft regardless of variations in attitude, comprising in combination: a control means including first and second movable elements, first and second conduits respectively connecting the top and bottom of the first tank to opposite sides of the first movable element, third and fourth conduits respectively connecting the top and bottom of the second tank to opposite sides of the second movable element, each of said conduits containing liquid, the liquid within said first and second conduits acting on said first element in opposite directions, the liquid within the third and fourth conduits acting on said second element in opposite directions, and a control member connecting the elements and positionable by the net difference in unbalanced forces developed on each element by the liquid in the respective conduits.

18. Apparatus in accordance with claim 17 wherein the top connected conduit for one of the tanks is filled with liquid to a greater height with respect to the bottom of the respective tank than the other top connected conduit is filled with respect to the bottom of its respective tank.

19. A differential pressure control device comprising a casing having an enlarged chamber at each end thereof, said chambers being separated by a partition in the casing, a bore in said partition, inlet and outlet passages in the casing communicating with the bore, a movable valve member mounted in the bore and having means for opening and closing communication between the inlet and outlet ports, a movable wall in each enlarged chamber and dividing the same into opposed pressure chambers, means including passages in the casing communicating with each pressure chamber whereby fluid may be introduced to both sides of each movable wall, the movable member forming a sliding seal in the bore preventing communication between the ports and the pressure chambers adjacent thereto, said movable walls being connected to opopsite ends of the valve member whereby movement of said walls in response to unbalanced fluid pressures acting thereon will position the valve member for controlling communication between the inlet and outlet ports.

20. Apparatus for controlling the relationship of heads in a pair of fuel tanks in an aircraft regardless of variations in attitude of the aircraft, comprising in combination: a discharge conduit connected to each tank, air under pressure at the top of each tank and acting on the fuel to discharge the same from each tank to the respective discharge conduit, a fluid pressure operated modulating valve in the discharge conduit of said second tank, a source of fluid pressure for operating said valve, a control valve including a movable valve member, first and second movable diaphragms attached to said valve member, first and second conduits respectively connecting the top and bottom of the first tank to opposite sides of the first diaphragm, third and fourth conduits connecting the top and bottom of the second tank to opposite sides of the second diaphragm, each of said four last mentioned conduits containing liquid subject to the air pressure within the respective tank, the liquid in the first and second conduits acting in opposite directions on the first diaphragm, the liquid in the third and fourth conduits acting in opposite directions on the second diaphragm, said movable valve member being positionable by the net difference in unbalanced forces acting on said diaphragm to control the flow of fluid under pressure to said modulating valve for regulating the rate at which said second tank empties to maintain a predetermined relationship in the heads of fuel in the two tanks.

References Cited in the file of this patent

UNITED STATES PATENTS

| | | |
|---|---|---|
| 1,547,429 | Ludeman | July 28, 1925 |
| 1,901,032 | Kallum | Mar. 14, 1933 |
| 2,035,533 | Campbell | Mar. 31, 1936 |
| 2,509,629 | De Giers et al. | May 20, 1950 |
| 2,601,849 | Lee II | July 1, 1953 |
| 2,726,671 | Zand et al. | Dec. 13, 1955 |
| 2,767,725 | Long | Oct. 23, 1956 |

FOREIGN PATENTS

| | | |
|---|---|---|
| 1,045,485 | France | June 24, 1953 |